United States Patent
Sasaki et al.

(10) Patent No.: US 6,883,573 B2
(45) Date of Patent: Apr. 26, 2005

(54) LAMINATION SYSTEM

(75) Inventors: Naotaka Sasaki, Kiryu (JP); Kenji Sugaya, Kiryu (JP); Shunichi Kawamata, Kiryu (JP); Kensuke Shoji, Kiryu (JP)

(73) Assignee: Japan Servo Co., Ltd., Tokyo (JP)

( * ) Notice: Subject to any disclaimer, the term of this patent is extended or adjusted under 35 U.S.C. 154(b) by 0 days.

(21) Appl. No.: 10/405,344

(22) Filed: Apr. 3, 2003

(65) Prior Publication Data

US 2003/0188831 A1 Oct. 9, 2003

(30) Foreign Application Priority Data

Apr. 4, 2002 (JP) ........................................ 2002-101967

(51) Int. Cl.⁷ .............................................. B32B 35/00
(52) U.S. Cl. .................... 156/351; 156/354; 156/364; 156/521; 156/555; 156/556
(58) Field of Search ................................ 156/256, 264, 156/263, 270, 350, 351, 353, 354, 355, 362, 378, 521, 308.2, 517, 555, 556, 543, 559, 580, 538, 364, 583.1, 519

(56) References Cited

U.S. PATENT DOCUMENTS

| 5,414,503 A | * | 5/1995 | Siegel et al. ................. 399/406 |
| 5,783,024 A | * | 7/1998 | Forkert ........................ 156/351 |
| 6,244,319 B1 | * | 6/2001 | Maynard et al. ............ 156/354 |
| 6,484,780 B1 | * | 11/2002 | Ashley et al. ............... 156/540 |

* cited by examiner

*Primary Examiner*—Chris Fiorilla
*Assistant Examiner*—Cheryl N. Hawkins
(74) *Attorney, Agent, or Firm*—Birch, Stewart, Kolasch & Birch, LLP

(57) ABSTRACT

In a lamination system for laminating a film with a heat adhesive layer on at least a surface of a plastic card applying heat and pressure by heat rollers, each of two rectification devices for rectifying warp in the laminated card is provided independently of each other, at the downstream of the heat rollers, respectively along each of sides of the card along card transfer direction. Each of the rectification devices comprises a pair of rotatable rollers.

3 Claims, 6 Drawing Sheets

LAMINATION SYSTEM

BACKGROUND OF THE INVENTION

1. Field of the Invention

The present invention concerns a lamination system for thermocompression bonding of a transparent film on a surface of a card such as an ID card.

2. Description of the Prior Art

In a conventional lamination system, a transparent film cut into a predetermined size and mounted on a base sheet (a carrier) is torn off from the base sheet and is laminated on a surface of a card by thermocompression bonding. Such lamination system is undesirable in view of the operation cost and the protection of environment, since the base sheet used is thrown away as waste material.

To solve such problem, a wasteless type lamination system has been developed and is being practically used.

In the wasteless type lamination system, a leading edge of a continuous transparent laminate film is drawn out from a supply roll; then, transferred along a film transfer path; then, cut in a predetermined length by a cutter; and then, further transferred along the film transfer path until the laminate film reaches a point of convergence where it meets a printed card.

On the other hand, the printed card put into the lamination system from a card printer is transferred to the point of convergence along a card transfer path.

At the point of convergence, the cut laminate film is laid on the printed card, and then, the cut laminate film and the printed card are further transferred to a thermocompression bonding place where the cut laminate film is laminated on the surface of the printed card by thermocompression bonding using a heat roller provided there.

Such wasteless type lamination system is advantageous in view of the operation cost and the protection of environment, since the laminate film is used after being cut in a necessary length and the base sheet is not used.

Further, a dual sided wasteless lamination system by which both surfaces of a card can be laminated simultaneously has been disclosed.

In the wasteless type lamination system of the prior art as explained above, a card sometimes warps after lamination. However, means or method for properly rectifying a warp in a laminated card has not been disclosed, or a disclosed one applies only a rectification force uniform in the longitudinal direction of the warped card using rollers having lengths corresponding to the width of the card. Accordingly, there has been a problem that warped laminated cards are sometimes not sufficiently rectified, depending on the characteristics of the laminate film used. Warped laminated cards are liable to be produced particularly in dual sided wasteless type lamination systems. A warp in a card may cause read/write error of magnetic data, or read error of bar code data. It also deteriorates the quality of the laminated card.

SUMMARY OF THE INVENTION

It is an object of the present invention to solve the above problem and to provide a lamination system capable of properly rectifying a warp in a card after lamination.

A lamination system according to a preferred embodiment of the present invention to achieve the above object has a thermocompression bonding means for laminating a laminate film with a heat adhesive layer on at least a surface of a card made of a plastic material applying heat and pressure by heat rollers; wherein each of two rectification means for rectifying warp in the card is provided independently of each other, at the downstream of the thermocompression bonding means, respectively along each of sides of the card along card transfer direction.

In the lamination system according to the preferred embodiment of the present invention, since each of the two rectification means for rectifying warp in the card is provided independently of each other, at the downstream of the thermocompression bonding means, respectively along each of sides of the card along card transfer direction, it is possible to apply force for rectifying the warp in the card after lamination, independently to each of sides of the card. Accordingly, the warp in the card can be properly rectified and the deterioration of the quality of the laminated card can be avoided.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
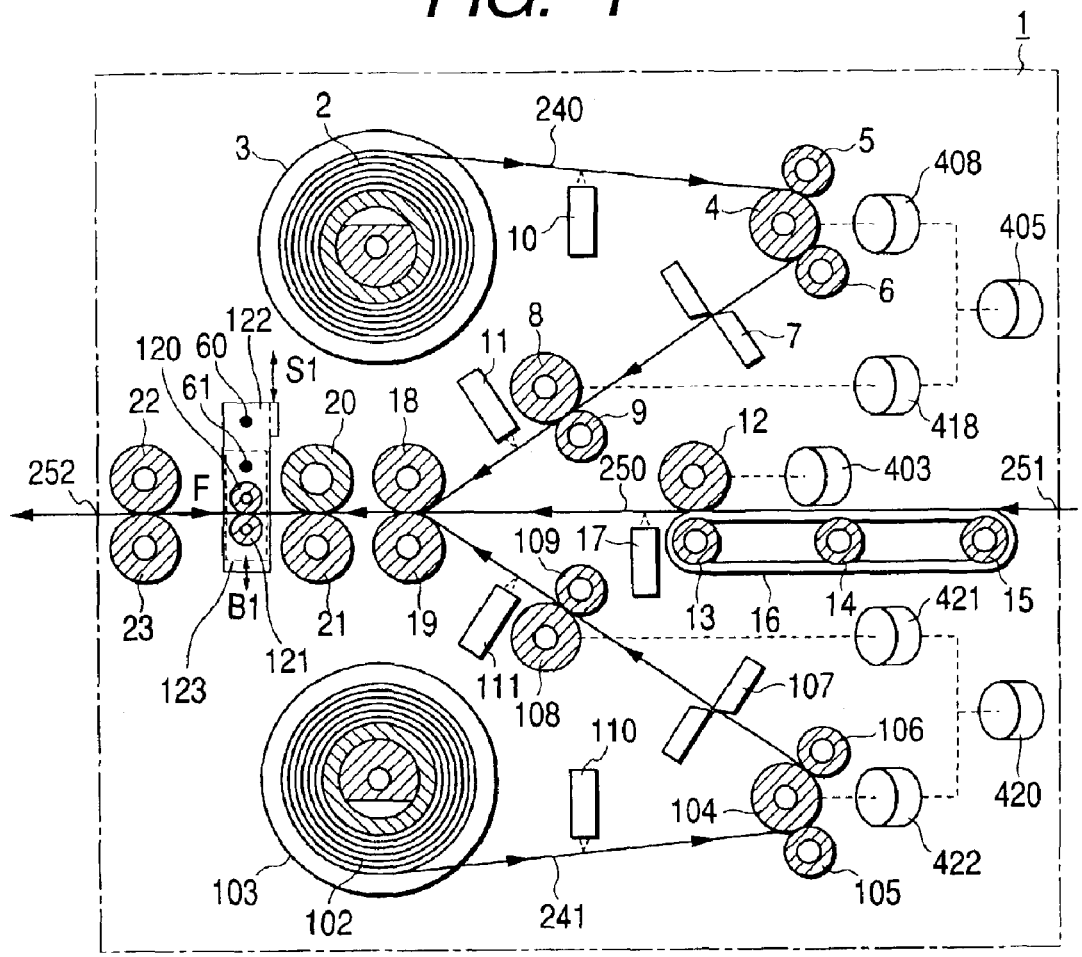
FIG. 1 is a schematic front view of a wasteless type lamination system according to an embodiment of the present invention.

FIG. 1 is a schematic front view of a wasteless type lamination system 1 according to an embodiment of the present invention. The wasteless type lamination system 1 of which whole construction is shown in FIG. 1 is the one to be used for laminating both surfaces of a card.

A transparent continuous laminate film having a thermocompression bonding layer on a surface is loaded in a supply roll 2 mounted on a supply spindle 3. A leading edge of the laminate film is drawn out from the supply roll 2 and transferred along a film transfer path 240 which is a first transfer path.

A laminate film supply monitoring sensor 10 composed of an optical sensor represented by a reflective type optical sensor is provided beside the film transfer path 240 and monitors the supply of the continuous laminate film.

The continuous laminate film is transferred through a roller 4, then, passed between two cutting blades of a cutter 7 which is a cutting means, then, transferred through rollers 8 and 9, and then, further transferred under a film detection sensor 11 which is a film detection means composed of an optical sensor also represented by a reflective type optical sensor. These rollers 4, 8 and 9 compose a film transfer means.

Distance L between the cutter 7 and the film detection sensor 11 is set to be a predetermined design value of the system.

Another film transfer path 241 which is another first transfer path is provided in another side of a card transfer path 250, that will be explained later, approximately symmetrical to the film transfer path 240 with regard to the card transfer path 250. Another transparent continuous laminate film also having a thermocompression bonding layer on a surface is loaded in a supply roll 102 mounted on a supply spindle 103. A leading edge of the laminate film is drawn out from the supply roll 102 and transferred along a film transfer path 241.

Another laminate film supply monitoring sensor 110 composed of an optical sensor also represented by a reflective type optical sensor is provided beside the film transfer path 241 and monitors the supply of the continuous laminate film.

The continuous laminate film is transferred through a roller 104, then, passed between two cutting blades of a cutter 107 which is another cutting means, then, transferred through rollers 108 and 109, and then, further transferred under a film detection sensor 111 which is another film detection means composed of an optical sensor also represented by a reflective type optical sensor.

Distance L between the cutter 107 and the film detection sensor 111 is set to be the predetermined design value of the system.

On the other hand, a printed card made of a plastic material is put into an inlet 251 of the lamination system 1. Then, the printed card is transferred on a belt 16 driven by rollers 13 to 15, and then, transferred along the card transfer path 250 which is a second transfer path, being held by the belt 16 located on the roller 13 and a roller 12 opposing the belt 16. Then, the printed card is transferred to a point of convergence, which is composed of rollers 18 and 19, and at which the film transfer path 240, the film transfer path 241 and the card transfer path 250 converge, after being positioned for registration using a detection signal detected by a card edge detection sensor 17 composed of an optical sensor also represented by a reflective type optical sensor. The rollers 12 to 15 and the belt 16 compose a card transfer means.

Drive force of a laminate film transfer motor 405 is transmitted to the roller 4 through a laminate load electric clutch 408. The drive force is further transmitted to rollers 5 and 6 through the roller 4 and the respective gears (not illustrated). Similarly, the drive force is transmitted to a roller 8 through a laminate feed electric clutch 418, and from the roller 8 to a roller 9 through a gear (not illustrated).

In this embodiment, a stepping motor is adopted as the laminate film transfer motor 405. Since an amount of rotation of a stepping motor can be precisely and easily controlled by controlling a number of drive pulses, amounts of rotation of the roller 4 and the roller 8 can also be precisely and easily controlled.

Further, by combining "on/off" controls of the laminate load electric clutch 408 and the laminate feed electric clutch 418 with the rotation control of the motor, transfer of the laminate film can be made more minutely.

Also in the film transfer path 241, in the manner similar to that in the film transfer path 240, drive force of a laminate film transfer motor 420 is transmitted to the roller 104 through a laminate load electric clutch 422. The drive force is further transmitted to rollers 105 and 106 through the roller 104 and the respective gears (not illustrated). Similarly, the drive force is transmitted to a roller 108 through a laminate feed electric clutch 421, and from the roller 108 to a roller 109 through a gear (not illustrated).

In this embodiment, a stepping motor is also adopted as the laminate film transfer motor 420 and amounts of rotation of the roller 104 and the roller 108 can also be precisely and easily controlled.

The printed card is transferred by a drive force of a card transfer motor 403. If a stepping motor is also adopted as the card transfer motor 403, transfer of the printed card can be more minutely controlled by controlling the number of drive pulses for the card transfer motor 403.

The drive force of the card transfer motor 403 is transmitted to a roller 12, and then, from a drive shaft (not illustrated) of the roller 12 to rollers 13 and 18, a heat roller 20 and a roller 22 through such as gears and/or synchronous belts (not illustrated). The drive force is further transmitted from these rollers to rollers opposing respectively these rollers through the respective gears (not illustrated).

Additionally, the laminate film transfer motors 405, 420 can be omitted and the drive force of the card transfer motor 403 may be transmitted to the rollers in the film transfer systems through appropriate electric clutches.

Further additionally, although stepping motors are used as the drive sources of the laminate film transfer motors 405, 420 and the card transfer motor 403 in the above explained embodiment, servomotors equipped with rotation sensors such as rotary encoders may be used as the drive sources in place of the stepping motors.

Figure 3:
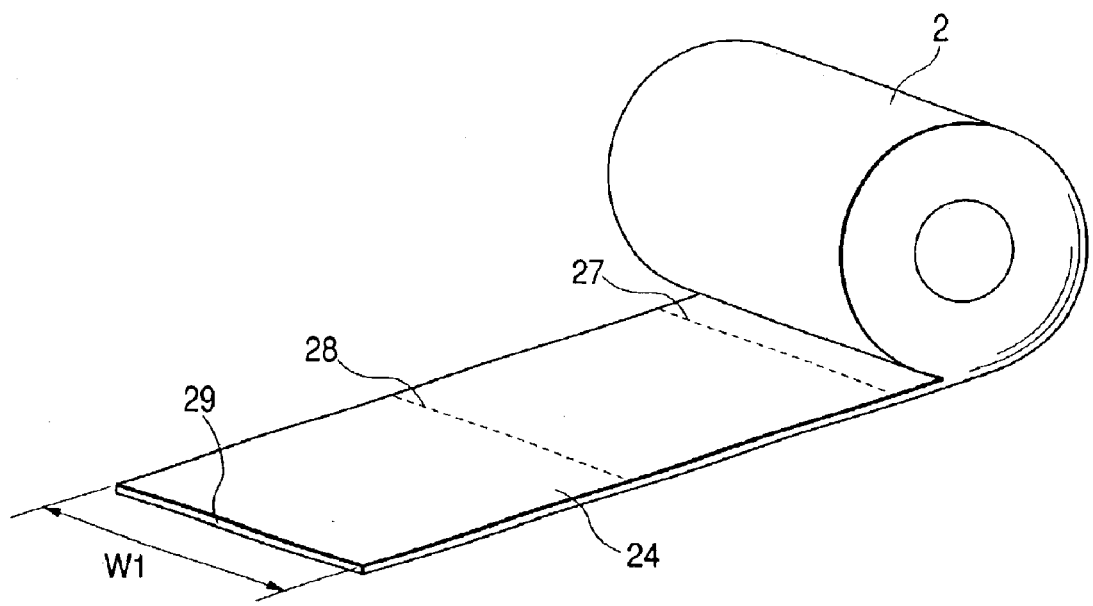
FIG. 3 is a schematic perspective view of an example of a supply roll of a laminate film suitable for use in the practice of the embodiment of the present invention.

FIG. 3 is a schematic perspective view of an example of a supply roll 2 of a laminate film 24 suitable for use in the practice of the embodiment of the present invention. As shown in FIG. 3, the leading edge 29 of a continuous laminate film 24 having a width W1 is drawn out from the supply roll 2 and cut successively along a cutting line 28, a cutting line 27 and so forth by the cutter 7. The continuous laminate film 24 may be a transparent film, or may be a film treated to have a hologram surface for preventing from forgery.

Figure 4:
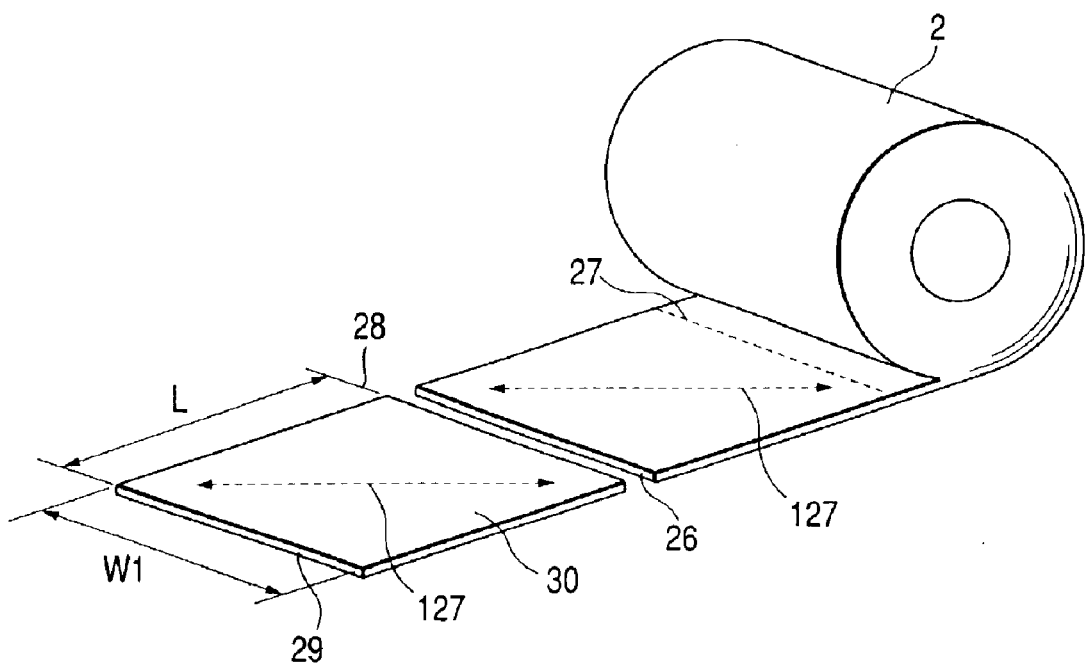
FIG. 4 is a schematic perspective view of the supply roll of the laminate film in FIG. 3 after the laminate film is cut from the supply roll.

FIG. 4 is a schematic perspective view of the supply roll 2 of the laminate film 24 in FIG. 3 after the laminate film 24 is cut from the supply roll 2. As shown in FIG. 4, the continuous laminate film 24 is cut along the cutting line 28 at a distance L from the leading edge 29, a cut laminate film 30 is made, and a new leading edge 26 is formed.

The continuous laminate film drawn out from the supply roll 102 (FIG. 1), and to be used for laminating another surface of the card, is also cut in the similar manner as explained above.

In FIG. 4, chain lines 127 with arrows show residual stresses brought when the base film is processed to manufacture the supply roll 2. As explained later, the card and the cut laminate film are bonded with each other being applied heat and pressure. When the card softened by the applied heat is cooled and hardened again, the residual stress causes the card to be warped, if such residual stress exists in the laminate film.

Each of the cut laminate films transferred respectively along the film transfer path 240 and the film transfer path 241 is laid on the each of the surfaces of the printed card respectively, at the above mentioned point of convergence. Then, the card and the cut laminate films are transferred to a place between the heat rollers 20, 21 composing a thermocompression bonding means provided downstream, and are laminated there by thermocompression bonding.

In an preferred embodiment of the present invention, two rectification devices, or rectification means, for rectifying a warp in a card after lamination are provided at the immediate downstream of the thermocompression bonding means. The rectification means comprises a pair of rotatable rollers contacting with the laminated card and supported by a support plate 122 (see FIG. 1). Each of the rectification devices is provided independently of each other, at the immediate downstream of the heat rollers 20, 21, respectively along each of sides of the card along card transfer direction.

The laminated card of which warp caused by the residual stress in the laminate film is rectified by the rectification devices is transferred through rollers 22, 23 to be discharged from an outlet 252 of the wasteless type lamination system 1 (see FIG. 1). An example of a card laminated in the manner as explained above is shown in FIG. 5.

Figure 2:
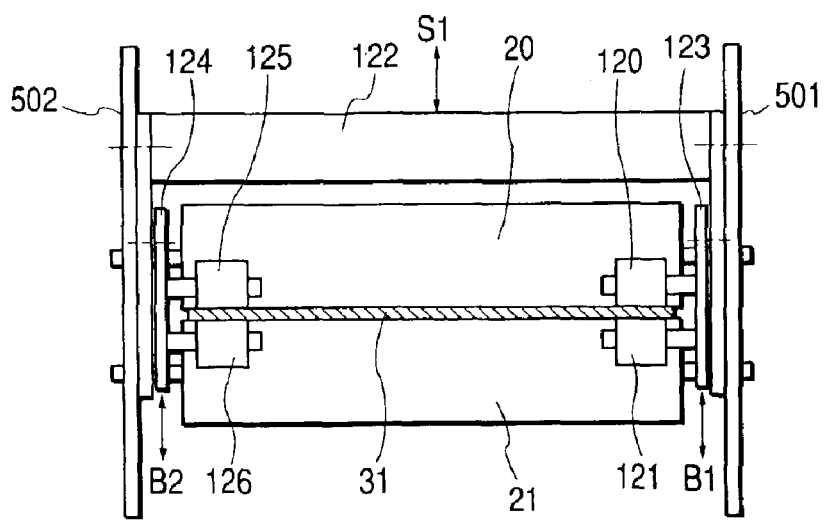
FIG. 2 shows rectification devices for rectifying a warp in a card, used in the wasteless type lamination system according to the embodiment of the present invention.

FIG. 2 shows the rectification devices for rectifying a warp in a card, used in the wasteless type lamination system 1 according to the embodiment of the present invention. FIG. 2 is a view of the rectification device seen from a direction indicated by an arrow F1 in FIG. 1.

Each of axes of the rotatable rollers 120, 121 for applying a rectification force to a side edge of the card 31 in the direction along the card transfer direction is fixed to a roller supporting plate 123. Vertical position of the roller supporting plate 123 is adjustable along the direction indicated by an arrow B1 in FIG. 2. The roller supporting plate 123 is placed in a desired position, then, fixed to a supporting plate 122 with a fixing screw 61 (see FIG. 1). Similarly, each of axes of the rotatable rollers 125, 126 for applying another rectification force to another side edge of the card 31 in the direction along the card transfer direction is fixed to a roller supporting plate 124. Vertical position of the roller supporting plate 124 is also adjustable along the direction indicated by an arrow B2 in FIG. 2. The roller supporting plate 124 is placed in a desired position, then, fixed to the supporting plate 122 with a fixing screw (not illustrated). Thus, a pair of the rollers 120, 121 and another pair of the rollers 125, 126 can be displaced, independently of each other, in the direction indicated by the arrow B1 or in the direction indicated by the arrow B2, relative to the card transfer path 250 (FIG. 1), and they are fixed respectively after positioned properly. Further, vertical position of the supporting plate 122 itself is adjustable along the direction indicated by an arrow S1 in FIG. 2. The supporting plate 122 is placed in a desired position, then, fixed to a frame 501 of the wasteless type lamination system 1 with a fixing screw 60 (see FIG. 1).

The supporting plate 122 is also fixed to the frame 502 of the wasteless type lamination system 1 with a fixing screw (not illustrated). However, the fixing screw to be used to fix the supporting plate 122 to the frame 502 may be omitted, if the supporting plate 122 has a sufficient rigidity.

Thus, since each of the vertical positions of the respective rectification devices can be adjusted independently of each other, warp in the card caused by any residual stress in the laminate film can be rectified.

Next, transfer process of the laminate film in the wasteless type lamination system 1 according to the embodiment of the present invention is explained briefly referring to FIG. 1.

The supply roll 2 is mounted on the supply spindle 3 of the wasteless type lamination system 1. The continuous laminate film of which leading edge is drawn out from the supply roll 2 is successively cut and transferred along the film transfer path 240. Similarly, the supply roll 102 is mounted on the supply spindle 103. The continuous laminate film of which leading edge is drawn out from the supply roll 102 is successively cut and transferred along the film transfer path 241.

Now, cutting process of the continuous laminate film of which leading edge is drawn out from the supply roll 2, along the film transfer path 240, is explained. Cutting process of the continuous laminate film of which leading edge is drawn out from the supply roll 102, along the film transfer path 241, is similar to that along the film transfer path 240, so the explanation is omitted.

Figure 6:
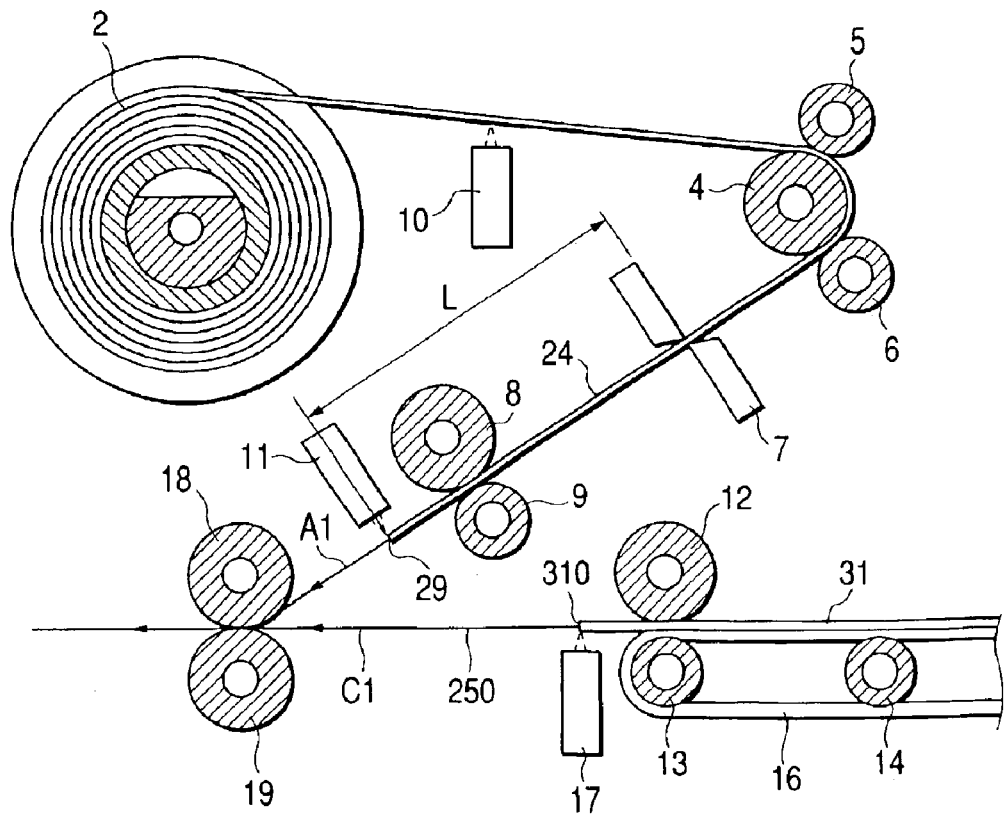
FIG. 6 is a schematic front view of a part of the wasteless type lamination system according to the embodiment of the present invention, immediately before the continuous laminate film is cut.
Figure 7:
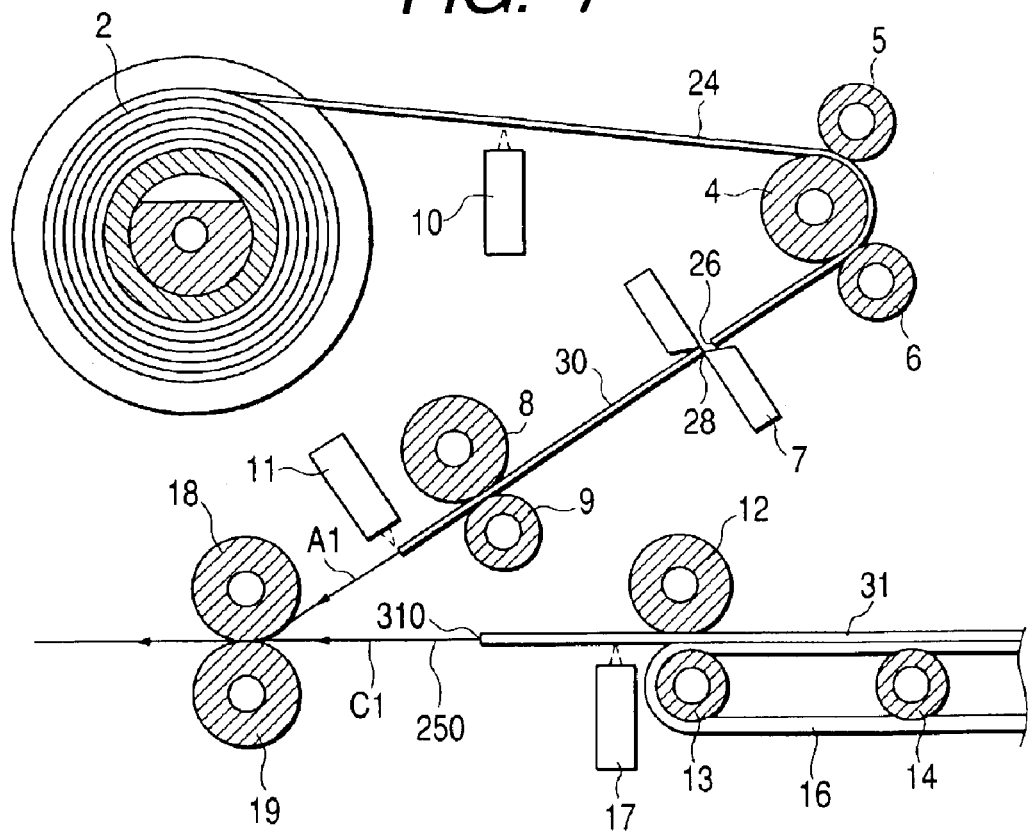
FIG. 7 is a schematic front view of a part of the wasteless type lamination system according to the embodiment of the present invention, immediately after the continuous laminate film is cut.

FIG. 6 is a schematic front view of a part of the wasteless type lamination system 1 according to the embodiment of the present invention, immediately before the continuous laminate film is cut. FIG. 7 is a schematic front view of a part of the wasteless type lamination system 1 according to the embodiment of the present invention, immediately after the continuous laminate film is cut.

At the start, both the laminate load electric clutch 408 and the laminate feed electric clutch 418 (FIG. 1) are made "connected" state capable of transmitting the drive force.

The leading edge 29 of the continuous laminate film 24 drawn out from the supply roll 2 is transferred passing through between the blades of the cutter 7 being driven by the drive force of the laminate film transfer motor 405 (FIG. 1). When the leading edge 29 of the continuous laminate film 24 is detected by the film detection sensor 11, the output signal of the film detection sensor 11 is activated. Based on the change in the output signal of the film detection sensor 11, the wasteless type lamination system 1 judges that the length of the continuous laminate film 24 existing between the cutter 7 and the film detection sensor 11 has become a predetermined length L to be cut, and stops the laminate film transfer motor 405 to stop momentarily the transfer of the continuous laminate film 24. Then, the cutter 7 is driven to make the cut laminate film 30 having the predetermined length L on the film transfer path 240.

After that, the laminate load electric clutch 408 (FIG. 1) is made "disconnected" state, and then, the laminate film transfer motor 405 is rotated again. The drive force of the laminate film transfer motor 405 is transmitted to the rollers 8 and 9 through the laminate feed electric clutch 418, and the cut laminate film 30 is transferred in the direction indicated by an arrow A1.

After that, the cut laminate film 30 as well as another cut laminate film brought along another film transfer path 241 are respectively laid on the top or bottom surface of the card 31 at the point of convergence. Then, the card and the cut laminate films are transferred to a place between the heat rollers 20, 21 and are laminated there by thermocompression bonding.

As explained before, the card 31 is softened by the heat applied in the thermocompression bonding. When the card 31 is cooled and hardened again, the residual stress causes the card 31 to be warped, if such residual stress exists in the laminate film. Accordingly, it is necessary to apply rectification forces to the card 31 in the reverse direction to the warp before the card 31 is cooled and hardened again to rectify the warp.

Figure 8:
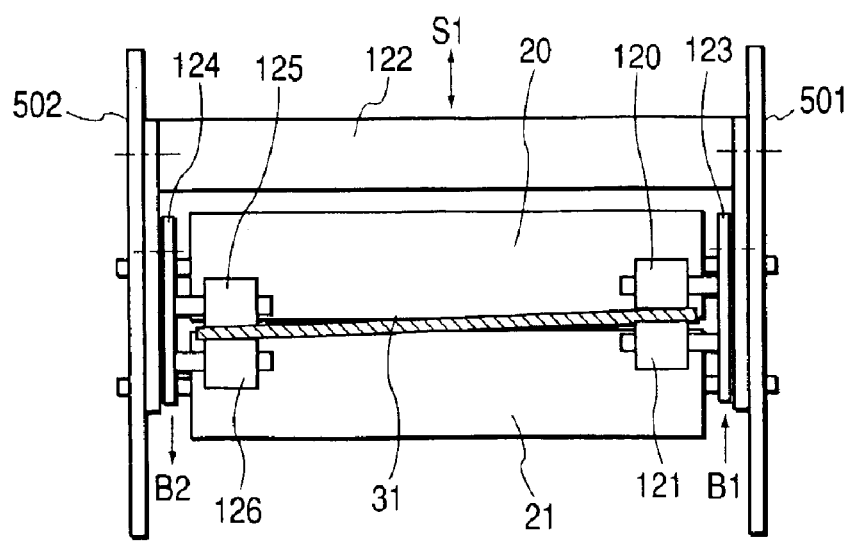
FIG. 8 shows the rectification devices in which rollers are placed in adjusted positions.

FIG. 8 shows the rectification devices in which the rollers are placed in adjusted positions. In this example, the warp in the card 31 immediately after lamination is rectified by displacing the pair of the rollers 120, 121 upward relative to the card transfer path 250, in the direction indicated by an arrow B1, and by displacing the pair of the rollers 125, 126 downward relative to the card transfer path 250, in the direction indicated by an arrow B2.

Figure 9:
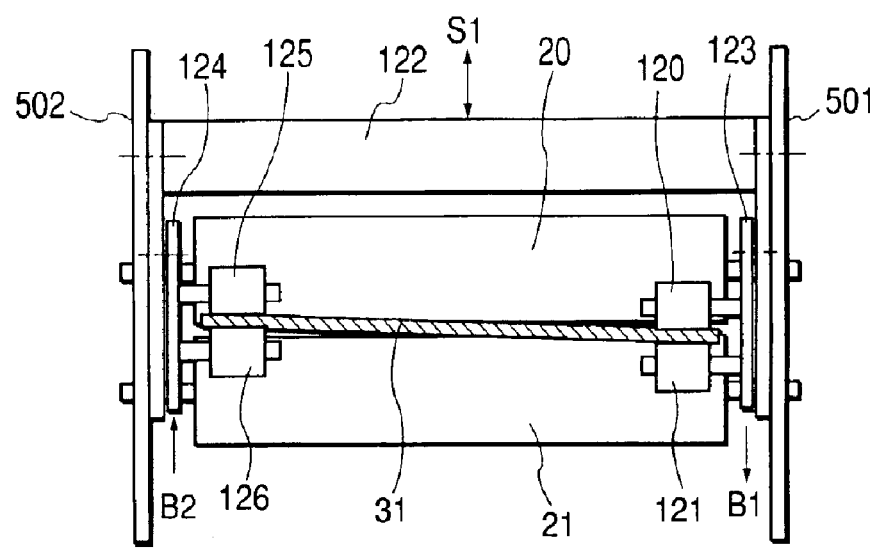
FIG. 9 shows the rectification devices in which rollers are placed in the other adjusted positions.

FIG. 9 shows the rectification devices in which the rollers are placed in adjusted positions. This example corresponds to a case in which a warp caused by residual stress in the inverse direction to that in the case shown in FIG. 8 is rectified. Accordingly, the warp in the card 31 immediately after lamination is rectified by displacing the pair of the rollers 120, 121 downward relative to the card transfer path 250, in the direction indicated by an arrow B1, and by displacing the pair of the rollers 125, 126 upward relative to the card transfer path 250, in the direction indicated by an arrow B2.

Figure 10:
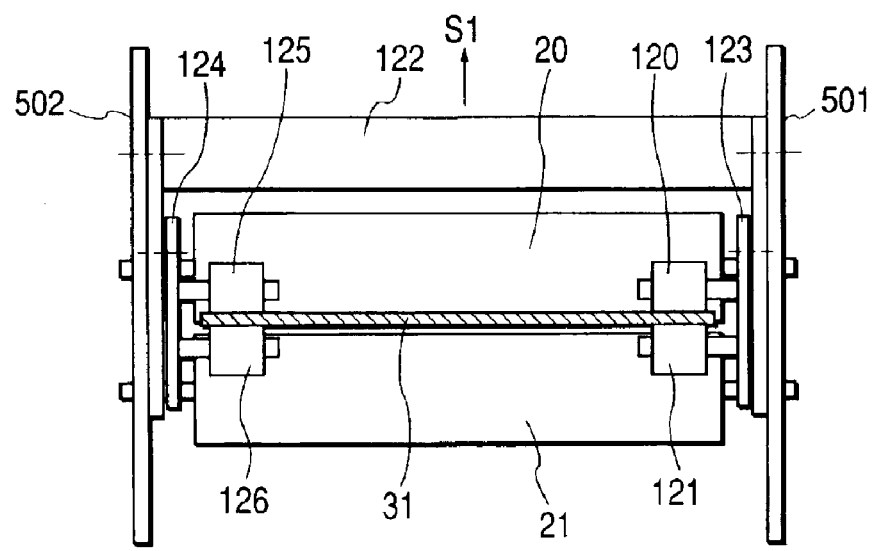
FIG. 10 shows the rectification devices in which a support plate is placed in an adjusted position.

In some cases, a residual stress may exist in the direction along the film transfer direction, an amount of a residual stress in the laminate film laid on the top surface of the card 31 may differ from that in the laminate film laid on the bottom surface of the card 31, or the thermocompression bonding force may differ according to the print condition of the surface of the card 31. In such cases, the rectification force is adjusted by displacing the pair of the rollers 120, 121 and the pair of the rollers 125, 126 by the same distance relative to the card transfer path 250, and by displacing the supporting plate 122 in the direction indicated by an arrow S1. FIG. 10 shows such example in which the position of the supporting plate 122 is thus adjusted.

Further, effective rectification of warp can be achieved by combining vertical displacement of each of the pairs of the rollers and that of the supporting plate 122.

The above explained motion of the wasteless type lamination system 1 according to the embodiment of the present invention is controlled by a controller comprising units such as micro processors.

Figure 11:
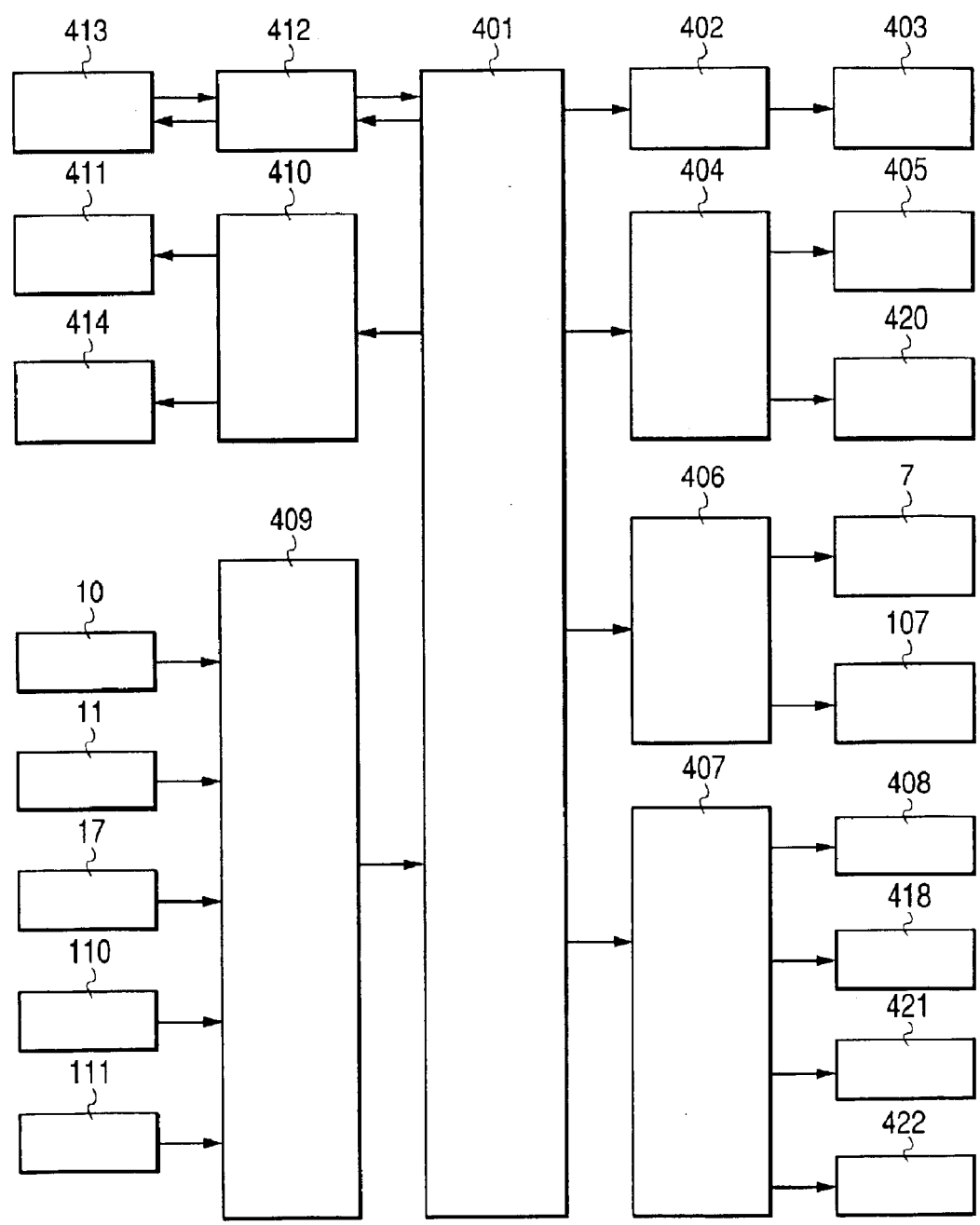
FIG. 11 is a block diagram of a controller for controlling the wasteless type lamination system according to the embodiment of the present invention.

FIG. 11 is a block diagram of a controller for controlling the wasteless type lamination system 1 according to the embodiment of the present invention.

The controller comprises a computation and processing unit 401, a card transfer control unit 402, a card transfer motor 403, a laminate film transfer control unit 404, the laminate film transfer motors 405, 420, a cutter drive unit 406, the cutters 7, 407, a clutch drive unit 407, the laminate load electric clutches 408, 422, the laminate feed electric clutches 418, 421, a sensor signal processing unit 409, the laminate film supply monitoring sensors 10, 110, the film detection sensors 11, 111, the card edge detection sensor 17, a heater temperature control unit 410, the heaters 411, 414, a control panel signal processing unit 412, and a control panel 413.

The laminate load electric clutch 408 connects or disconnects driving force of the laminate film transfer motor 405 (FIG. 1) to the roller 4 (FIG. 1). The laminate feed electric clutch 418 connects or disconnects driving force of the laminate film transfer motor 405 to the roller 8 (FIG. 1). Similarly, the laminate load electric clutch 422 connects or disconnects driving force of the laminate film transfer motor 420 (FIG. 1) to the roller 104 (FIG. 1). The laminate feed electric clutch 421 connects or disconnects driving force of the laminate film transfer motor 420 to the roller 108 (FIG. 1). Additionally, the rollers 5 and 6 (FIG. 1) are connected to the roller 4 through gears provided with respective shafts. Also, the rollers 8 and 9 (FIG. 1) are connected with each other through gears provided with respective shafts. Similarly, the rollers 105 and 106 (FIG. 1) are connected to the roller 104 through gears provided with respective shafts. The rollers 12 to 15 provided beside the card transfer path 250 (FIG. 1) are driven by the drive force of the card transfer motor 403.

Operation of the controller for the lamination system 1 according to the embodiment of the present invention is as follows.

First, the computation and processing unit 401 makes, through the laminate film transfer control unit 404, the laminate film transfer motor 405 rotate to draw out the continuous laminate film 24 (FIG. 6). At the same time, the computation and processing unit 401 makes the laminate load electric clutch 408 and the laminate feed electric clutch 418 "connected" state through the clutch drive unit 407. Then, the roller 4 and the roller 8 are rotated being synchronized with each other, and the laminate film 24 is transferred until the leading edge 29 (FIG. 6) reaches a responsive position of the film detection sensor 11 (FIG. 6).

When the leading edge 29 of the laminate film 24 reaches the responsive position of the film detection sensor 11, the output of the film detection sensor 11 becomes activated. The activated output signal is transmitted through the sensor signal processing unit 409 into the computation and processing unit 401.

The computation and processing unit 401 stores temporarily the point at which the activated signal is transmitted as a position information in an internal memory. The position information is used later as a reference point for transmitting the cut laminate film and the printed card being synchronized with each other.

When the computation and processing unit 401 receives the activated output signal, it instructs, through the laminate film transfer control unit 404, the laminate film transfer motor 405 to stop rotation. Then, the computation and processing unit 401 drives, through the cutter drive unit 406, the cutter 7 to cut the laminate film 24.

After the laminate film 24 is cut, the computation and processing unit 401 makes the laminate feed electric clutch 418 "connected" state and the laminate load electric clutch 408 "disconnected" state through the clutch drive unit 407. Then, the computation and processing unit 401 makes the laminate film transfer motor 405 rotate, through the laminate film transfer control unit 404. Thus, the cut laminate film 30 (FIG. 7) is transferred in the direction indicated by an arrow A1 in FIG. 7.

Control for elements in connection with the film transfer path 241 (FIG. 1) is also made in the similar sequence as explained above.

On the other hand, the output signal of the card edge detection sensor 17 that detects the leading edge 310 of the printed card 31 (FIG. 6) is transmitted to the computation and processing unit 401 through the sensor signal processing unit 409. The point at which the leading edge 310 of the printed card 31 is detected is temporarily stored as a position information in the internal memory of the computation and processing unit 401 and is referred to as the reference point for the succeeding control of the transfer of the printed card 31. Thus, the printed card 31 is transferred, by the rollers such as the roller 12 (FIG. 7) connected to the card transfer motor 403 controlled by a command pulse signal, along the card transfer path 250 (FIG. 7), in the direction indicated by an arrow C1 in FIG. 7.

Similarly, the cut laminate films are also transferred respectively being synchronized with the printed card 31 along the laminate film transfer path 240 or the laminate film transfer path 241 (FIG. 1).

Each of the cut laminate films is respectively laid on the each of the surfaces of the printed card 31 at the point of convergence of the film transfer path 240, the film transfer path 241 and the card transfer path 250. Then, the cut laminate films and the printed card 31 are transferred to the place between the heat rollers 20, 21 (FIG. 1) provided at the downstream. In each of the central portions of the heat rollers 20, 21, the heaters 411, 414 are provided respectively. Temperatures in the heaters 411, 414 are controlled by the heater temperature control unit 410 to make the temperatures at the surfaces of the heat rollers 20, 21 proper for the lamination. Thus, the respective cut laminate films are certainly laminated on the respective surfaces of the printed card 31 by thermocompression bonding.

Figure 5:
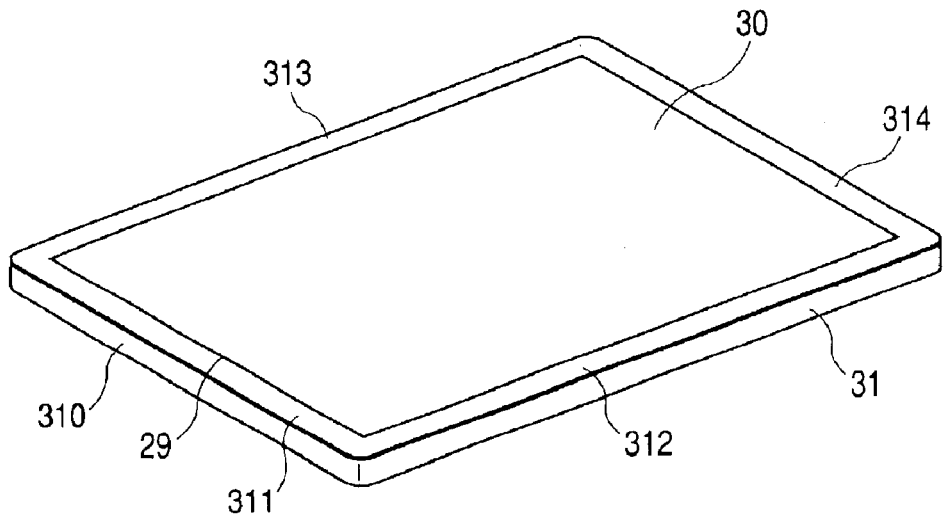
FIG. 5 is a perspective view of a printed card on a surface of which a cut laminate film is bonded by the wasteless type lamination system according to the embodiment of the present invention.

FIG. 5 is a perspective view of an example of the printed card 31 on a surface of which the cut laminate film 30 is bonded, and warp is rectified, by the wasteless type lamination system 1 according to the embodiment of the present invention. The cut laminate film is also bonded on the bottom surface (not illustrated) of the card 31. If a magnetic stripe is provided on a surface of the printed card 31, the lamination is made avoiding the place where the magnetic stripe is provided. If it is the case, warps are more liable to be caused due to the difference between the lamination of the top surface and that of the back surface, as well as the residual stress in the cut laminate film. Also in such case, the warps can be effectively rectified, since the wasteless type lamination system 1 according to the embodiment of the present invention can rectify warps in various directions by displacing each of the pair of rollers 121, 120, the pair of rollers 125, 126 and the supporting plate 122 independently of each other.

In the above explanation of the wasteless type lamination system 1 according to the embodiment of the present invention, the explanation is made for a case in which the card transfer motor 403 and the laminate film transfer motors 405, 420 are provided separately as the drive sources of the lamination system 1. In place of these motors, a single motor to which a plurality of electric clutches to connect/disconnect drive force to the respective rollers is connected may be used.

Also, although the explanation is made for a case in which the reflective type optical sensors are used as the sensors for detecting such as the laminate film and the printed card, sensors of other types may also be used.

Additionally, PVC is generally being used as the materials of the card to be laminated. However, the wasteless type lamination system 1 of the present invention can be used for a card made of a composite material such as PET-G. Further, the wasteless type lamination system 1 of the present invention can be used for any card regardless of the material of which the card is made.

Further additionally, the object to be laminated by the wasteless type lamination system 1 of the present invention is not limited to an ID card or the like. The wasteless type lamination system 1 of the present invention is applicable to a lamination of a continuous film, being successively cut, on a substrate in any form.

Further, the rectification device for rectifying a warp in a card used in the embodiment of the wasteless type lamination system 1 of the present invention can be applied to a conventional lamination system in which a transparent film cut into a predetermined size and mounted on a base sheet (a carrier) is torn off from the base sheet and is laminated on a surface of a card by thermocompression bonding, such as explained in the Description of the Prior Art.

Further, the rectification device can be applied to a wasteless type lamination system by which only a face of a card is laminated, omitting one of the transfer paths from the wasteless type lamination system 1.

In the lamination system 1 according to the preferred embodiment of the present invention, since each of the two rectification devices for rectifying warp in the card 31, each comprising the pair of the rotatable rollers 120, 121, or the pair of the rotatable rollers 124, 125, is provided independently of each other, at the downstream of the heat rollers 20, 21, respectively along each of sides of the card 31 along the card transfer direction, it is possible to apply force for rectifying the warp in the card 31 after lamination, independently to each of sides of the card 31. Accordingly, the warp in the printed card 31 can be properly rectified and the deterioration of the quality of the laminated card can be avoided.

What is claimed is:

1. A lamination system having a thermocompression bonding means for laminating a laminate film with a heat adhesive layer on at least a surface of a card made of a plastic material by applying heat and pressure by heat rollers; wherein two rectification means for rectifying warp in said card are provided independently of each other, downstream of said thermocompression bonding means, respectively along each side of said card along a card transfer direction, said two rectification means capable of being displaced independently of each other along a plane transverse to the direction of travel of the card and fixed in place, each of said rectification means comprising a pair of opposing rotatable rollers, with said opposing pairs of rollers each adapted to engage opposite edges of said card as said card travels along said card transfer direction.

2. The lamination system according to claim 1 comprising:
    at least one film transfer path along which a continuous laminate film with a heat adhesive layer on a surface and drawn out from a supply roll is transferred;
    a film transfer means for transferring said continuous laminate film along said at least one film transfer path;
    a cutting means, provided beside said at least one film transfer path, for cutting said continuous laminate film in a predetermined length; and
    a card transfer means for transferring a card along a card transfer path that converges with said at least one film transfer path at a point of convergence;
    wherein said thermocompression bonding means carries out thermocompression bonding of at least one cut laminate film laid on a surface of said card, downstream of said point of convergence.

3. The lamination system according to claim 2, wherein two film transfer paths are provided; and two cut laminate films are laid and laminated respectively on each of the surfaces of said card.

* * * * *